United States Patent [19]
Fuji

[11] Patent Number: 5,638,350
[45] Date of Patent: Jun. 10, 1997

[54] MULTIBEAM RECORDING/REPRODUCING APPARATUS IN WHICH DIRECTION OF MOVEMENT OF PLURALITY OF LIGHT BEAMS IS DETERMINED BASED ON ORDER IN WHICH EACH OF LIGHT BEAMS CROSSES TRACK

[75] Inventor: Hiroshi Fuji, Souraku-gun, Japan

[73] Assignee: Sharp Kabushiki Kaisha, Osaka, Japan

[21] Appl. No.: 355,622

[22] Filed: Dec. 14, 1994

[30] Foreign Application Priority Data

Dec. 16, 1993  [JP]  Japan .................................. 5-316126

[51] Int. Cl.$^6$ ............................................ G11B 7/00
[52] U.S. Cl. ........................ 369/44.37; 369/44.28; 369/32
[58] Field of Search .................. 369/32, 44.35, 369/44.37, 44.38, 44.79, 44.31, 44.28, 44.27, 47, 48

[56] References Cited

U.S. PATENT DOCUMENTS

| | | | |
|---|---|---|---|
| 4,929,822 | 5/1990 | Nakamura et al. | 369/44.37 |
| 5,267,226 | 11/1993 | Matsuoka et al. | 369/44.37 |
| 5,313,440 | 5/1994 | Füldner et al. | 369/32 |
| 5,361,245 | 11/1994 | Hoshida et al. | 369/44.28 |
| 5,440,535 | 8/1995 | Takagi et al. | 369/44.28 |
| 5,457,670 | 10/1995 | Maeda et al. | 369/44.37 |

FOREIGN PATENT DOCUMENTS

| | | |
|---|---|---|
| 59-185044 | 10/1984 | Japan . |
| 64-60823 | 3/1989 | Japan . |
| 5-12677 | 1/1993 | Japan . |

*Primary Examiner*—Tan Dinh
*Attorney, Agent, or Firm*—David G. Conlin; Brian L. Michaelis

[57] ABSTRACT

A multibeam recording/reproducing apparatus is disclosed in which respective light beams are arranged so as to have a predetermined interval in the direction in which the light beams cross a track. Reflected light from an optical recording medium which is produced by irradiation with each of the light beams is detected. The order in which each of the light beams crosses a track is determined based on change, which occurs for every crossing of the track by each of the light beams, of each received reflected light. A number representative of change of reflected light is counted. Based on the crossing order and the number of change, the direction of movement and the speed of movement of the light beams are determined. Based on this information, the light beams are moved to a desired track.

17 Claims, 7 Drawing Sheets

FIG. 4
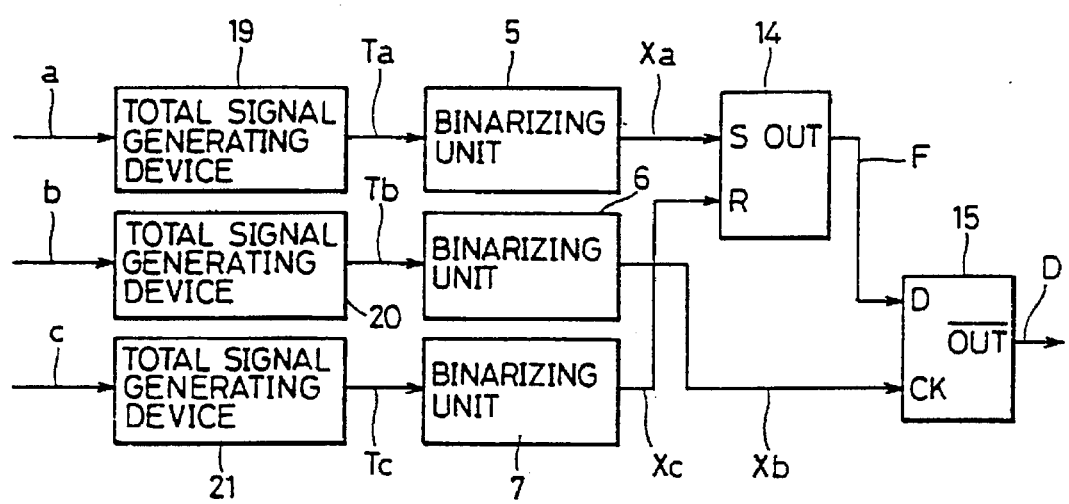
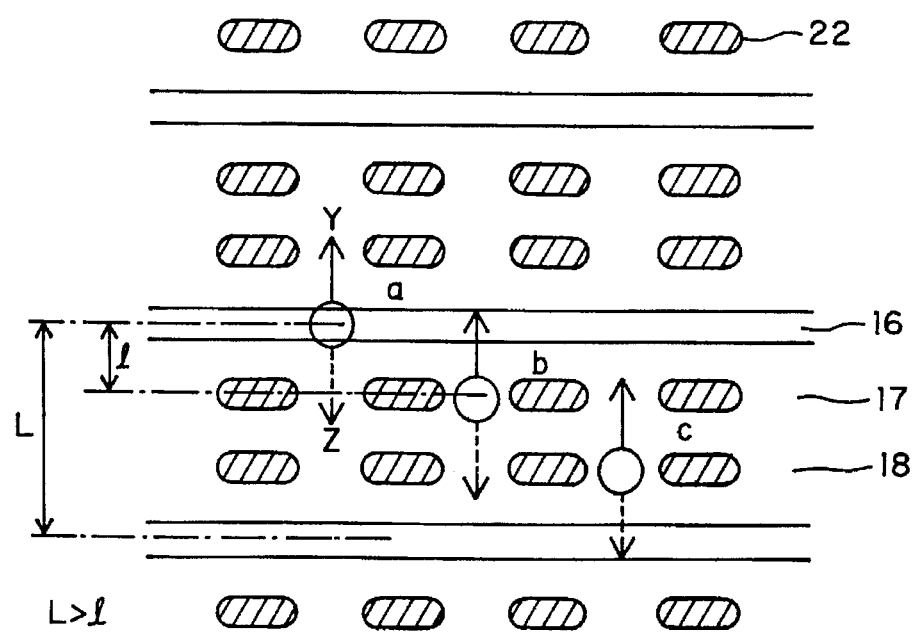
FIG. 5

MULTIBEAM RECORDING/REPRODUCING APPARATUS IN WHICH DIRECTION OF MOVEMENT OF PLURALITY OF LIGHT BEAMS IS DETERMINED BASED ON ORDER IN WHICH EACH OF LIGHT BEAMS CROSSES TRACK

BACKGROUND OF THE INVENTION

1. Field of the Invention

The present invention generally relates to multibeam recording/reproducing apparatuses, and more particularly, to a multibeam recording/reproducing apparatus recording/reproducing information by irradiating an optical recording medium with a plurality of light beams.

2. Description of the Background Art

In an optical recording medium driving device disclosed in Japanese Patent Laying-Open No. 5-12677 and an optical disk driving device disclosed in Japanese Patent Laying-Open No. 64-60823, reflected light of a single light beam is converted into an electrical signal by a two-divided detector to generate a sum signal and a difference signal. Based on the phase relationship between the two signals, the direction of movement of light beams is determined.

An optical memory device disclosed in Japanese Patent Laying-Open No. 59-185044 is a multibeam recording/reproducing apparatus irradiating an optical recording medium with a plurality of light beams, wherein tracking control is carried out by one of the plurality of light beams, and information is recorded/reproduced by the other light beams.

In the former apparatus using a two-divided detector, an adder and a subtractor for generating a sum signal and a difference signal, respectively, are required in order to determine the crossing direction of light beams, preventing simplification of the apparatus. The same problem occurs when the concept of the apparatus is applied to the above multibeam recording/reproducing apparatus. There is a need to have a method of determining the direction of movement of light beams suitable for the multibeam recording/reproducing apparatus.

SUMMARY OF THE INVENTION

One object of the present invention is to determine the direction of movement of light beams in a multibeam recording/reproducing apparatus without using a two-divided detector.

Another object of the present invention is to simplify a determining circuit determining the direction of movement of light beams in a multibeam recording/reproducing apparatus.

In order to achieve the above objects, a multibeam recording/reproducing apparatus according to the present invention records/reproduces information by irradiating with a plurality of light beams an optical recording medium having a plurality of tracks formed concentrically or spirally, including an optical beam arranging device arranging light beams so that respective two adjacent light beams have a predetermined interval therebetween in the direction in which the light beams cross a track, an optical beam moving device moving the light beams so as to cross a track, a reflected light receiving device receiving light reflected from the optical recording medium which is produced by irradiation with each of the light beams, a crossing order determining device determining the order in which each of the light beams crosses a track based on change, which occurs for every crossing of a track by each of the light beams, of each received reflected light, and a movement direction determining device determining the direction of movement of the light beams based on the determined crossing order.

In the multibeam recording/reproducing apparatus structured as described above, the direction of movement of light beams is determined based on the order in which each of light beams crosses a track. Therefore, a non-divided detector can be used as the reflected light receiving device, thereby simplifying the structure of the apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing a specific structure of a multibeam recording/reproducing apparatus according to a fourth embodiment of the present invention, corresponding to FIG. 2 of the first embodiment.

FIG. 5 is a diagram showing the positional relationship between tracks of an optical recording medium used in the multibeam recording/reproducing apparatus of each embodiment of the present invention and reflected light produced by light beams.

DESCRIPTION OF THE PREFERRED EMBODIMENTS

[First Embodiment]

Figure 1:
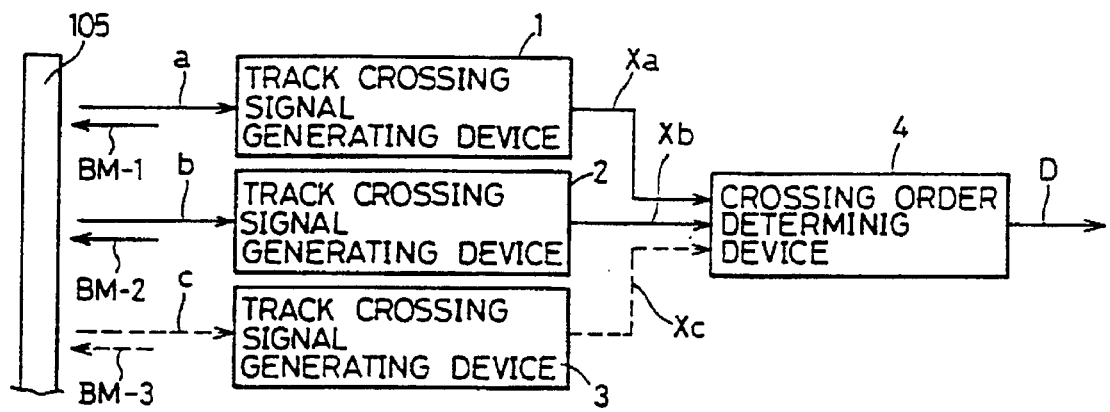
FIG. 1 is a diagram showing a main portion of a multibeam recording/reproducing apparatus according to a first embodiment of the present invention.

FIG. 1 shows a main portion of a multibeam recording/reproducing apparatus of the first embodiment of the present invention. For simplicity of description, only a main portion involved in the present invention will be described. In this embodiment, only reflected light a and reflected light b are used among reflected light a, reflected light b, and reflected light c from an optical recording medium irradiated with three light beams BM-1, BM-2, and BM-3. Reflected light a and reflected light b are applied to track crossing signal generating devices 1 and 2, respectively. Total signals Xa and Xb generated therein are applied to a crossing order determining device 4 for output of a crossing order signal D. If reflected light a crosses a track before reflected light b, for example, crossing order signal D attains a low level. On the contrary, if reflected light b crosses a track before reflected light a, the signal D attains a high level.

Figure 2:
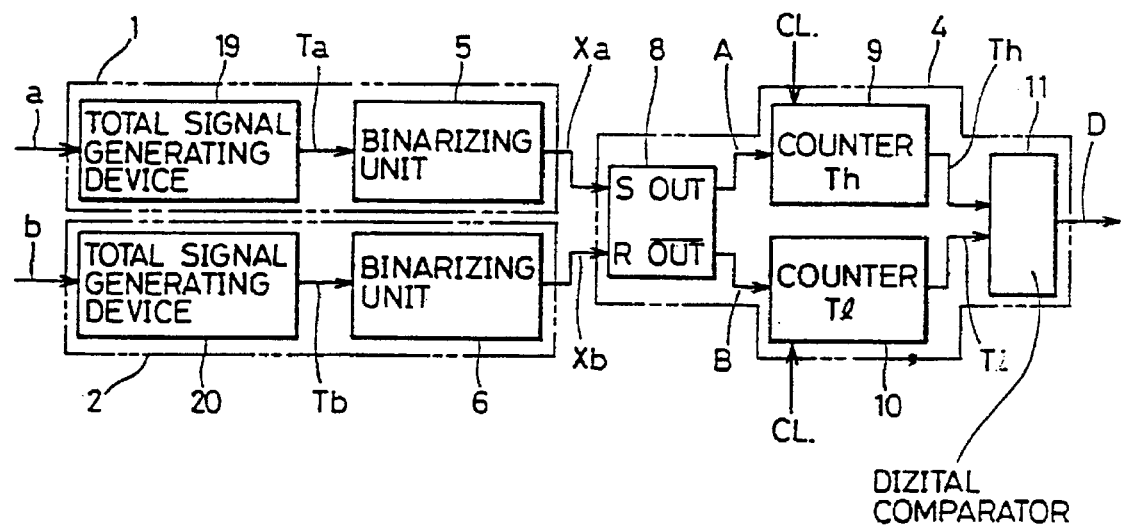
FIG. 2 is a block diagram showing a specific structure of track crossing signal generating devices 1 and 2, and a crossing order determining device 4 shown in FIG. 1.

FIG. 2 is a diagram explaining the main portion of the apparatus shown in FIG. 1 in more detail. Reflected light a and reflected light b are applied to total signal generating devices 19 and 20, respectively. Total signals Ta and Tb generated therein are applied to binarizing units 5 and 6, and converted into binary signals Xa and Xb. It should be noted that a total signal means a sum signal of a two-divided detector receiving reflected light. Track crossing signal Xa is applied to a set input terminal S of an RS flip-flop 8, and track crossing signal Xb is applied to a reset input terminal R of RS flip-flop 8. An output signal A is applied to a counter 9 from an output terminal of RS flip-flop 8. An inverted output signal B is applied to a counter 10 from an inverted output terminal of RS flip-flop 8. Counter 9 counts a time Th when output signal A is at a high level in response to clocks CL. Counter 10 counts a time Tl when output signal A is at a low level (when inverted output signal B is at a high level) in response to clocks CL. Times Th and Tl are applied to a digital comparator 11 to determine which is longer, Th or Tl. If Th is shorter than Tl, crossing order signal D attains a low level. On the contrary, if Th is longer than Tl, the signal attains a high level.

FIG. 5 is a diagram showing a state in which an optical recording medium is irradiated with light beams, in order to show operation of the apparatus of FIG. 1.

In this example, a track 16 among tracks 16, 17 and 18 is used both for obtaining a track crossing signal and for tracking. Track 16 is formed of a recessed groove or a projected land. The remaining two tracks 17 and 18 do not include a recessed groove or a projected land. A recording mark 22 is recorded on tracks 17 and 18 by magneto-optic recording, for example. More specifically, total signals of reflected light a, reflected light b, and reflected light c change only when light beams cross track 16. The total signals do not change when light beams cross track 17 and 18.

In FIG. 5, only track 16 is formed of a recessed groove or a projected land, as described above. However, it is possible to form tracks 17 and 18 of a recessed groove or a projected land. In this case, the depth of a groove or land of track 16 may be larger than that of tracks 17 and 18, or the width of a groove or land of track 16 may be larger than that of tracks 17 and 18. By such a structure, change of only a total signal (or tracking error signal) of reflected light due to track 16 can be made large, and it is possible to distinguish change of the total signal based on reflected light due to track 16 from that of the other total signals based on reflected light due to the other tracks. In this case, information can be recorded on any of tracks 16, 17 and 18. Further, although two lines of tracks 17 and 18 not having a recessed groove or a projected land are formed between tracks 16, it is possible to increase the number of lines of tracks interposed between tracks 16.

Figure 6:
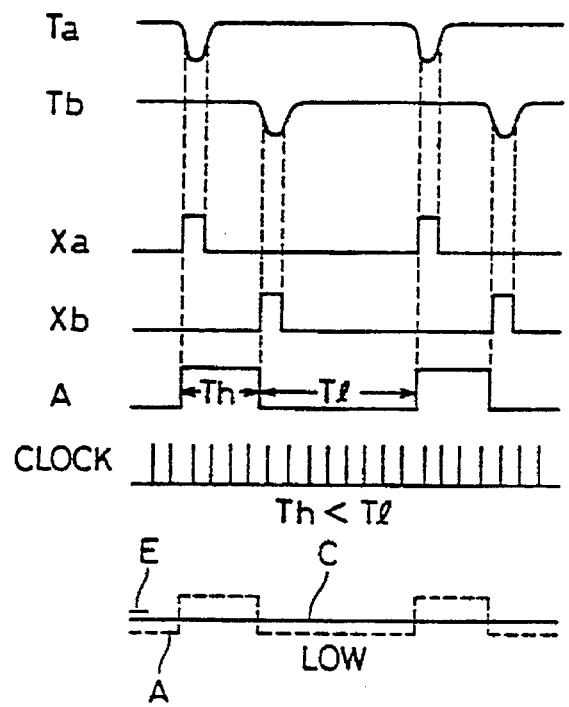
FIG. 6 is a diagram showing one example of signal waveforms in the multibeam recording/reproducing apparatus according to the first and second embodiments of the present invention.

FIG. 6 is a diagram showing waveforms of signals generated by the apparatus shown in FIG. 2.

In this example, light beams producing reflected light a, reflected light b, and reflected light c simultaneously move in the direction indicated by an arrow Y in FIG. 5, and the light beam producing reflected light a crosses track 16 before the light beam producing reflected light b. When the light beams cross track 16, the level of total signal Ta based on reflected light a decreases before the level of total signal Tb based on reflected light b. Track crossing signals Xa and Xb obtained by binarization of the total signals attain a high level when respective light beams cross a track. When signal Xa attains a high level, RS flip-flop 8 is set. When signal Xb attains a high level, RS flip-flop 8 is reset. Therefore, output signal A of RS flip-flop 8 has low level time Tl longer than high level time Th. Times Th and Tl when output signal A is at a high level and a low level, respectively, are counted in response to clocks CL. Times Th and Tl are applied to digital comparator 11 to determine which is longer, time Th or Tl. In this example, since time Th is shorter than Tl, crossing order signal D attains a low level. More specifically, it can be determined that the light beam producing reflected light a crosses track 16 before the light beam producing reflected light b, making it possible to determine that the light beams move in the direction indicated by arrow Y in FIG. 5.

Figure 7:
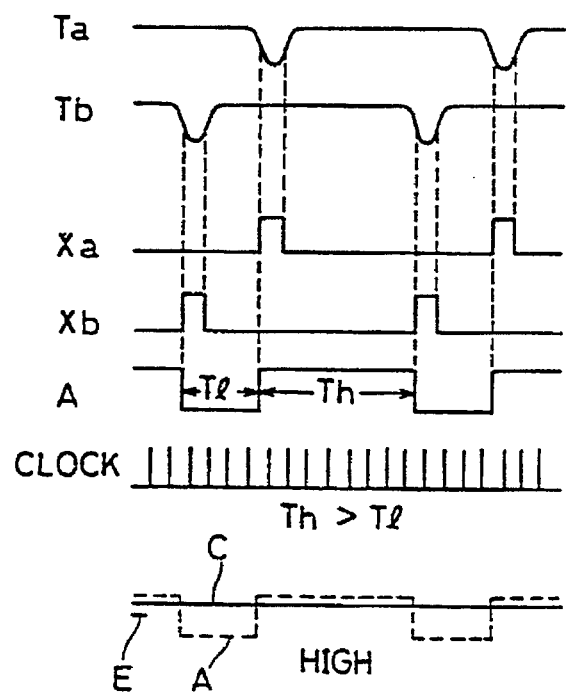
FIG. 7 is a diagram showing another example of signal waveforms in the multibeam recording/reproducing apparatus according to the first and second embodiments of the present invention.

FIG. 7 shows another example of waveforms of the signals generated by the apparatus shown in FIG. 2.

In this example, light beams producing reflected light a, reflected light b, and reflected light c move in the direction indicated by an arrow Z in FIG. 5, which is opposite to the direction indicated by arrow Y, and the light beam producing reflected light b crosses track 16 before the light beam producing reflected light a. When the light beams cross track 16, the level of total signal Tb based on reflected light b decreases before the level of total signal Ta based on reflected light a. Therefore, output signal A has low level time Tl shorter than high level time Th. Since time Tl is shorter than time Th, crossing order signal D attains a high level. More specifically, it can be determined that the light beam producing reflected light b crosses track 16 before the light beam producing reflected light a, making it possible to determine that the light beams move in the direction indicated by arrow Z in FIG. 5.

[Second Embodiment]

Figure 3:
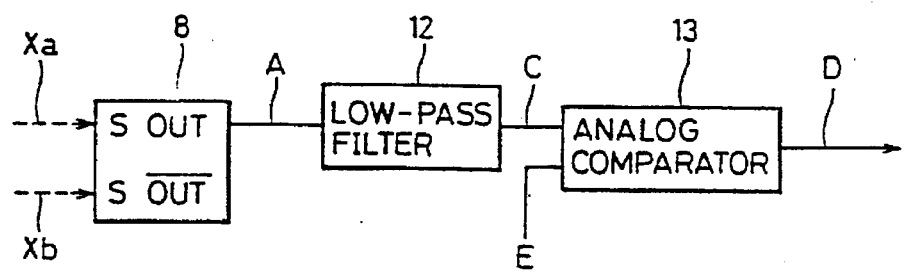
FIG. 3 is a diagram showing a specific structure of a multibeam recording/reproducing apparatus according to a second embodiment of the present invention, corresponding to FIG. 2 of the first embodiment.

FIG. 3 shows a main portion of the multibeam recording/reproducing apparatus of the second embodiment of the present invention. The structure and operation from input of reflected light a and reflected light b to input of the track crossing signals to RS flip-flop 8 are the same as those of FIG. 2. Therefore, the illustration and description will not be repeated. Output signal A is applied to a low-pass filter 12 from an output terminal of RS flip-flop 8. A signal C smoothed therein is applied to one input terminal of an analog comparator 13. Analog comparator 13 compares the level of signal C with a predetermined threshold value E, and determines which is larger, C or E. If signal C is smaller than the threshold value E, for example, crossing order signal D attains a low level. On the other hand, if signal C is larger than the threshold value E, signal D attains a high level.

When the light beam producing reflected light a crosses track 16 before the light beam producing reflected light b as shown in FIG. 6, time Th is shorter than time Tl. Therefore, as shown in the bottom line of the figure, output signal C of low-pass filter 12 becomes smaller than the threshold value E, and crossing order signal D attains a low level. More specifically, it can be determined that the light beam producing reflected light a crosses track 16 before the light beam producing reflected light b, making it possible to determine that the light beams move in the direction indicated by arrow Y in FIG. 5.

On the other hand, also when the light beam producing reflected light b crosses track 16 before the light beam producing reflected light a, output signal C of low-pass filter 12 becomes larger than the threshold value E, and crossing order signal D attains a high level, as shown in the bottom line of FIG. 7.

[Third Embodiment]

Figure 8:
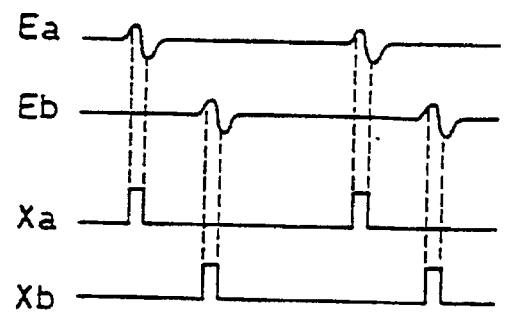
FIG. 8 is a diagram showing one example of signal waveforms in the multibeam recording/reproducing apparatus according to a third embodiment of the present invention.
Figure 9:
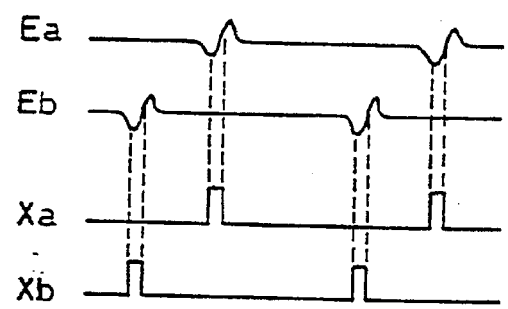
FIG. 9 is a diagram showing another example of signal waveforms in the multibeam recording/reproducing apparatus according to the third embodiment of the present invention.

Description will be given of the third embodiment of the present invention with reference to FIGS. 8 and 9. The main portion of an apparatus according to the third embodiment is structured by replacing total signal generating devices 19 and 20 of the apparatus shown in FIG. 2 with tracking error signal generating devices. More specifically, in this embodiment, track crossing signals Xa and Xb are generated based on change of tracking error signals Ea and Eb, each of which is a difference signal of a two-divided detector, instead of a sum signal of the two-divided detector. FIG. 8 shows the case where the light beam producing reflected light a crosses track 16 before the light beam producing reflected light b. FIG. 9 shows the case where the light beam producing reflected light b crosses track 16 before the light beam producing reflected light a.

[Fourth Embodiment]

FIG. 4 shows the main portion of a multibeam recording/reproducing apparatus according to the fourth embodiment of the present invention. In this embodiment, reflected light a, reflected light b, and reflected light c from an optical recording medium irradiated with three light beams are used. Reflected light a, reflected light b, and reflected light c are applied to total signal generating devices 19, 20 and 21. Total signals Ta, Tb and Tc generated therein are applied to binarizing units 5, 6 and 7, and converted into binary signals. Track crossing signal Xa obtained in binarizing unit 5 is applied to set input terminal S of an RS flip-flop 14, and track crossing signal Xc obtained in binarizing unit 7 is applied to reset input terminal R of RS flip-flop 14. An output signal F from an output terminal of RS flip-flop 14 is applied to an input terminal of a D flip-flop 15. Track crossing signal Xb obtained in binarizing unit 6 is applied to a clock input terminal of RS flip-flop 14. Crossing order signal D is provided from an inverted output terminal of D flip-flop 15. As a result, the order of change of track crossing signals Xa, Xb and Xc is determined. If signals Xa, Xb and Xc change in this order, crossing order signal D attains a low level. On the other hand, if signals Xc, Xb and Xa change in this order, crossing order signal D attains a high level.

Figure 10:
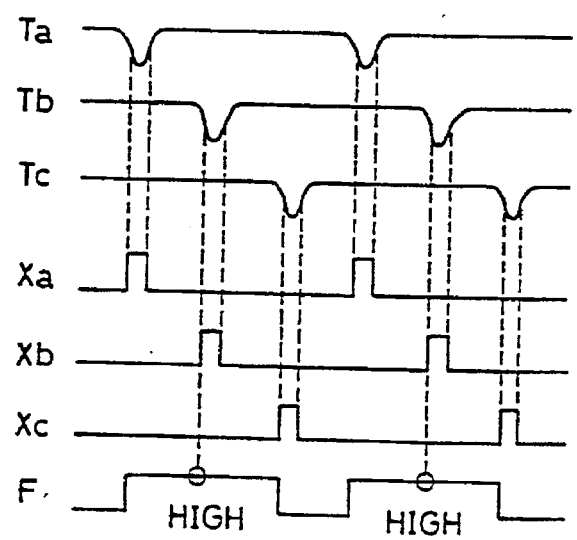
FIG. 10 is a diagram showing one example of signal waveforms in the multibeam recording/reproducing apparatus according to the fourth embodiment of the present invention.

FIG. 10 shows waveforms of signals generated by the apparatus according to the fourth embodiment of the present invention. In this example, light beams producing reflected light a, reflected light b, and reflected light c simultaneously move in the direction indicated by arrow Y in FIG. 5, and the light beams cross track 16 in the order of reflected light a, reflected light b, and reflected light c. When the light beams cross track 16, the levels of total signals Ta, Tb and Tc decrease in this order. Track crossing signals Xa, Xb and Xc obtained by binarization of these signals attain a high level when respective light beams cross the track. When signal Xa attains a high level, RS flip-flop 14 is set. When signal Xc attains a high level, RS flip-flop 14 is reset. Therefore, when track crossing signal Xb attains a high level, output signal F of RS flip-flop 14 is always at a high level. If output signal F and track crossing signal Xb are applied to a data input terminal and a clock input terminal of D flip-flop 15, respectively, crossing order signal D provided from an inverted output terminal of D flip-flop 15 attains a low level. More specifically, it can be determined that the light beams producing reflected light a, reflected light b, and reflected light c cross track 16 in this order, making it possible to determine that the light beams move in the direction indicated by arrow Y in FIG. 5.

Figure 11:
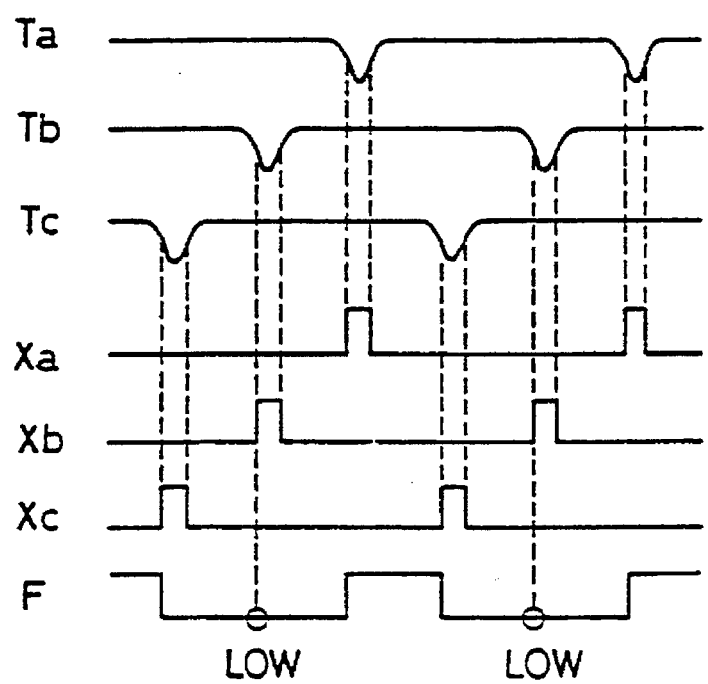
FIG. 11 is a diagram showing another example of signal waveforms in the multibeam recording/reproducing apparatus according to the fourth embodiment of the present invention.

FIG. 11 shows another example of waveforms of the signals generated by the apparatus according to the fourth embodiment of the present invention.

In this example, the light beams producing reflected light a, reflected light b, and reflected light c move in the direction indicated by an arrow Z, which is opposite to the direction indicated by arrow Y, in FIG. 5, and the light beams cross track 16 in the order of reflected light c, reflected light b, and reflected light a. When respective light beams cross track 16, the levels of total signals Tc, Tb and Ta decrease in this order. Track crossing signals Xc, Xb and Xa obtained by binarization of these signals attain a high level in this order. Therefore, when track crossing signal Xb attains a high level, output signal F of RS flip-flop 14 is always at a low level. If output signal F and track crossing signal Xb are applied to the data input terminal and the clock input terminal of D flip-flop 15, respectively, crossing order signal D provided from an inverted output terminal of D flip-flop 15 attains a high level. More specifically, it can be determined that the light beams cross track 16 in the order of reflected light c, reflected light b, and reflected light a, making it possible to determine that the light beams move in the direction indicated by arrow Z in FIG. 5.

Three light beams are used in the above fourth embodiment, while two light beams are used in the first to third embodiments. However, since the apparatus according to the fourth embodiment unnecessitates counters 9 and 10, and comparator 11 in the first embodiment, and low-pass filter 12 and comparator 13 in the second embodiment, it is possible to simplify the circuit configuration. It should be noted that flip-flop 14 can be configured by a more simple circuit than a counter or comparator.

[Fifth Embodiment]

Figure 12:
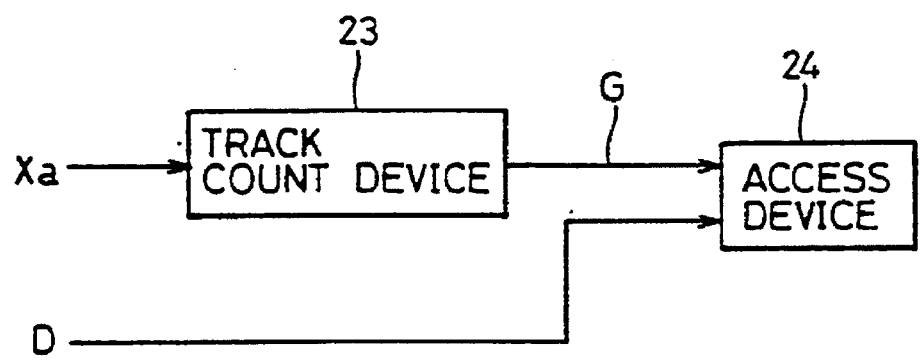
FIG. 12 is a diagram showing a light beam access portion of a multibeam recording/reproducing apparatus according to a fifth embodiment of the present invention.

FIG. 12 is a diagram showing a light beam access portion of a multibeam recording/reproducing apparatus according to the fifth embodiment of the present invention.

Referring to the figure, crossing order signal D obtained in the apparatus according to the above each embodiment is applied to an access device 24. On the other hand, obtained track crossing signal Xa (which may be Xb or Xc) is applied to a track count device 23. In track count device 23, the number of tracks to be crossed is counted, and the count value G is applied to access device 24. Access device 24 determines the direction of movement of light beams in response to crossing order signal D, and accesses a desired track with an optical head while calculating the distance of movement, the speed of movement or the like based on the count value G.

Figure 13:
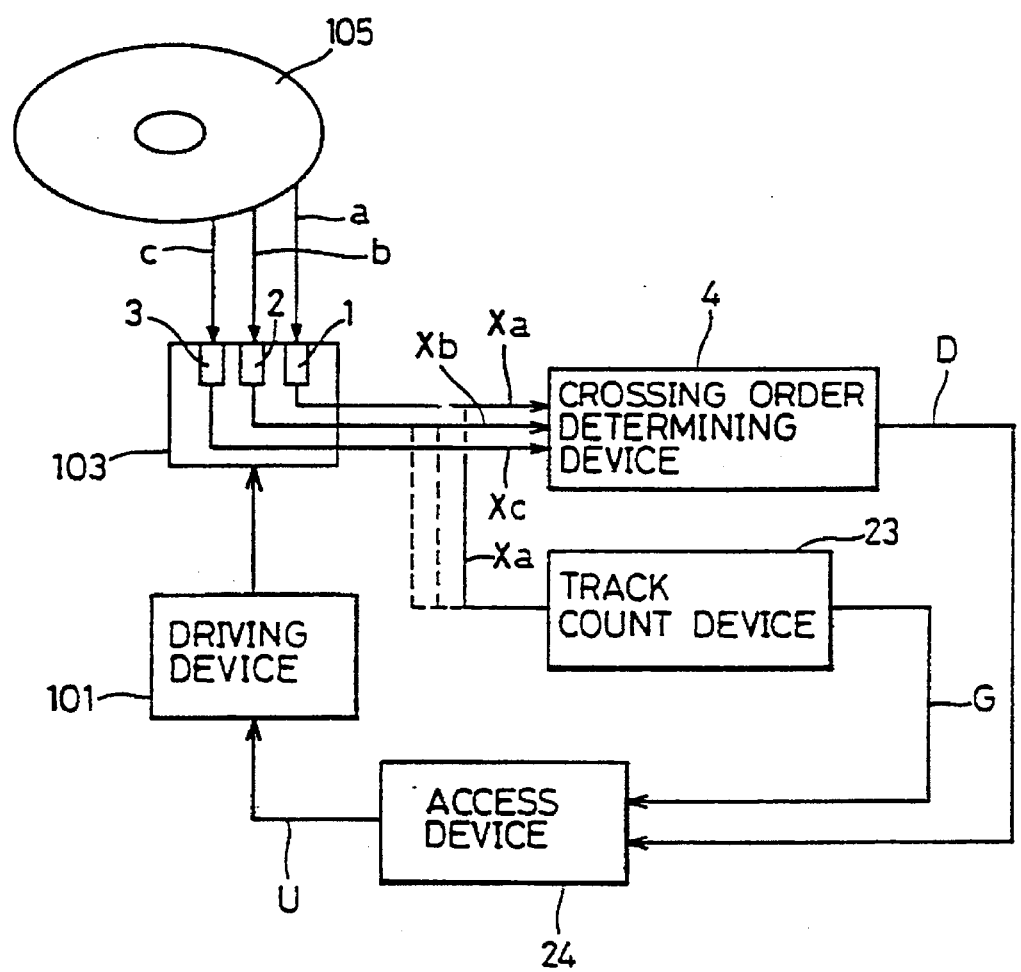
FIG. 13 is a diagram showing a main portion of the entire structure of the multibeam recording/reproducing apparatus including an access device 24 of FIG. 12.

FIG. 13 is a diagram showing a main portion of the entire structure of a multibeam recording/reproducing apparatus including access device 24 shown in the fifth embodiment of FIG. 12.

Referring to the figure, reflected light a, reflected light b, and reflected light c from an optical recording medium 105 are introduced into track crossing signal generating devices 1, 2 and 3 provided in an optical head 103. Each of track crossing signal generating devices 1, 2 and 3 is structured of a two-divided photodetector, a subtracting circuit or an adding circuit, and the like. Track crossing signals Xa, Xb and Xc generated in track crossing signal generating devices 1, 2 and 3 are applied to a crossing order determining device 4, and crossing order signal D is provided. One signal (signal Xa in this example) of track crossing signals Xa, Xb and Xc is applied to a track count device 23, and the count value G is provided therefrom. Crossing order signal D and the count value G are applied to access device 24. In response to the signal and the value, an access signal U is provided to a driving device 101. In response to the signal U, driving device 101 makes optical head 103 move to a desired track, and access is carried out.

Figure 14:
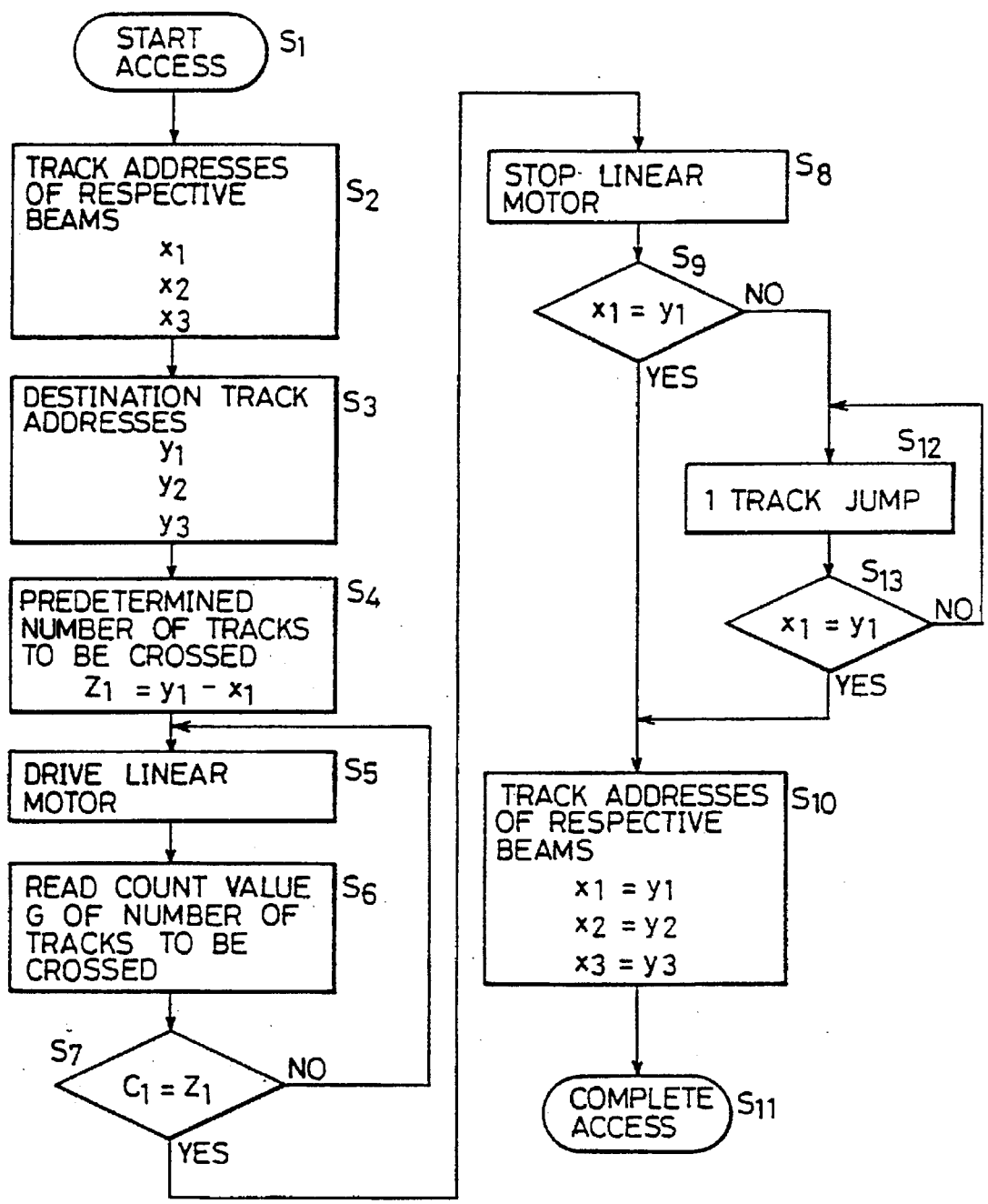
FIG. 14 is a flow chart showing control operation of access device 24 of FIG. 13.

FIG. 14 is a flow chart showing control operation of the access device shown in FIG. 13.

When access is started (S1), track addresses of respective reflected light beams are read (S2). In this embodiment, x1, x2 and x3 which are track addresses of reflected light a, reflected light b, and reflected light c are read. Then, destination track addresses y1, y2, and y3 of respective light beams after access are read (S3). Then, a predetermined number of tracks to be crossed z1=y1−x1 is calculated (S4) only for reflected light a, for example. Driving a linear motor (S5), the count value G of the number of tracks to be crossed is read only by reflected light a (S6), and the count value G is compared with the predetermined number z1 of tracks to be crossed (S7). If the value and the number do not match, the linear motor is continuously driven (S5). If the value and the number match, the linear motor is stopped (S8). Only track address x1 of reflected light a is compared with destination track address y1 (S8). If these addresses do not match, one track jump is carried out (S12), and these addresses are again compared (S13). If these addresses do not match again, one track jump is repeated until they match (S12). As described above, track address x1 of reflected light a and destination track address y1 are matched. Finally, by confirming that track addresses x1, x2 and x3 of respective light beams and destination track addresses y1, y2 and y3 are matched (S10), access is completed (S11).

As described above, according to the present invention, the order in which each of light beams cross a track is determined based on track crossing signals (either sum signals or difference signals, for example) in order to determine the direction of movement of the light beams. Only one of a sum signal and a difference signal is required.

Although a two-divided detector is used in each of the above embodiments, it is possible to determine the direction of movement of light beams based on track crossing signals obtained by a non-divided detector. As described above, the multibeam recording/reproducing apparatus with a simplified structure can determine the direction of movement of light beams.

If the above embodiments, an optical disk recording/reproducing apparatus was taken as an example. However, the same effects can be obtained in a recording/reproducing apparatus such as a card and a tape, an additional store type optical recording/reproducing apparatus, and a rewritable type optical recording/reproducing apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multibeam recording/reproducing apparatus for recording/reproducing information by irradiating with a plurality of light beams an optical recording medium having a plurality of tracks formed concentrically or spirally, for obtaining a track crossing signal, said apparatus comprising:

light beam arranging means for arranging said light beams so that said light beams are located in a predetermined order in the direction crossing said tracks;

light beams moving means for moving said light beams so that said light beams cross one of said tracks;

reflected light receiving means for receiving reflected lights from said optical recording medium, said reflected lights being produced by irradiation with said light beams; and crossing order and movement direction determining means for determining the order and a direction of movement in which said light beams cross said one of said tracks based on relative order of occurrences of changes in said received reflected lights; wherein said order determined by said crossing order and movement direction determining means indicates the direction of movement of said light beams.

2. The multibeam recording/reproducing apparatus as recited in claim 1, wherein said light beams include a first light beam and a second light beam, and an interval between adjacent tracks among said tracks is larger than an interval between said first light beam and said second light beam.

3. The multibeam recording/reproducing apparatus as recited in claim 2, wherein said crossing order and movement direction determining means includes crossing signal generating means for converting said reflected lights received by said reflected light receiving means into electrical signals and based on change of said converted electrical signals indicating that said first light beam crosses said one of said tracks, and a second crossing signal indicating that said second light beam crosses said one of said tracks, said crossing order and movement direction determining means determining an order in which said light beams cross said one of said tracks based on said generated first and second crossing signals.

4. The multibeam recording/reproducing apparatus as recited in claim 3, wherein said crossing order and movement direction determining means further includes comparing means for comparing a time from generation of said first crossing signal to generation of said second crossing signal with a time from generation of said second crossing signal to generation of said first crossing signal, said crossing order and movement direction determining means determining an order in which said light beams cross said one of said tracks, based on the comparison result of said comparing means.

5. The multibeam recording/reproducing apparatus as recited in claim 4, wherein said reflected light receiving means includes a two-divided detector, and said crossing signal generating means treats a sum of signals obtained by said two-divided detectors as said electrical signal.

6. The multibeam recording/reproducing apparatus as recited in claim 4, wherein said reflected light receiving means includes a two-divided detector, and said crossing signal generating means treats a difference between signals obtained by said two-divided detector as said electrical signal.

7. The multibeam recording/reproducing apparatus as recited in claim 4, wherein said reflected light receiving means includes a non-divided detector, and said crossing signal generating means treats a signal obtained by said non-divided detector as said electrical signal.

8. The multibeam recording/reproducing apparatus as recited in claim 3, further comprising:

track counting means for counting the number of generation of at least one of said first crossing signal and said second crossing signal; and access means for controlling said light beam moving means so that said light beams are moved to a desired track based on said counted number of generation and said determined direction of movement.

9. The multibeam recording/reproducing apparatus as recited in claim 1, wherein said light beams include a first light beam, a second light beam, and a third light beam arranged in this order in the direction crossing said one of said tracks.

10. The multibeam recording/reproducing apparatus as recited in claim 9, wherein said crossing order and movement direction determining means includes crossing signal generating means for converting said reflected lights received by said reflected light receiving means into electrical signals, and based on change of said converted electrical signals for generating a first crossing signal indicating that said first light beam crosses said track, a second crossing signal indicating that said second light beam crossed said track, and a third crossing signal indicating that said third light beam crosses said track, said crossing order and movement direction determining means determining the order in which said light beams cross said one of said tracks based on said generated, first, second and third crossing signals.

11. The multibeam recording/reproducing apparatus as recited in claim 10, wherein said crossing order and movement direction determining means further includes determining means for determining whether said second crossing signal is generated or not during a time from generation of said first crossing signal to generation of said third crossing signal, said crossing order and movement direction determining means determining the order in which said light beams cross said one of said tracks based on the determination result of said determining means.

12. The multibeam recording/reproducing apparatus as recited in claim 11, wherein said reflected light receiving means includes a two-divided detector, and said crossing signal generating means treats a sum of signals obtained by said two-divided detector as said electrical signal.

13. The multibeam recording/reproducing apparatus as recited in claim 11, wherein said reflected light receiving means includes a two-divided detector, and said crossing signal generating means treats a difference between signals obtained by said two-divided detector as said electrical signal.

14. The multibeam recording/reproducing apparatus as recited in claim 11, wherein said reflecting light receiving means includes a non-divided detector, and said crossing signal generating means treats a signal obtained by said non-divided detector as said electrical signal.

15. The multibeam recording/reproducing apparatus as recited in claim 10, further comprising:

track counting means for counting the number of generation of at least one of said first crossing signal, said second crossing signal, and said third crossing signal; and access means for controlling said light beam moving means so that said light beams are moved to a desired track based on said counted number of generation and said determined direction of movement.

16. A multibeam recording/reproducing apparatus for recording/reproducing information by irradiating an optical recording medium with a plurality of light beams, comprising:

at least two track crossing signal generating means each for converting respective one of said light beams reflected from said optical recording medium into an electrical signal, and for generating a track crossing signal for every crossing of a track by respective one of said light beams; and crossing order and movement direction determining means for determining the relative order of generation of said track crossing signals and, based on said relative order of generation of said track crossing signals, for determining the movement direction of said light beams, said multibeam recording/reproducing apparatus applying at least two generated track crossing signals to said crossing order and movement direction determining means to determine the direction of crossing of a track by said light beams.

17. The multibeam recording/reproducing apparatus as recited in claim 16, further comprising track counting means for counting the number of generation of said track crossing signal to provide a count value, said multibeam recording/reproducing apparatus moving said light beams while confirming the distance of movement, the direction of movement, or the speed of movement of an optical head irradiated with said light beams, based on the direction of crossing of a track by said light beams determined by said crossing order determining means, and the count value provided by said track counting means.

* * * * *